(12) United States Patent
Apostolopoulos et al.

(10) Patent No.: US 7,802,168 B1
(45) Date of Patent: Sep. 21, 2010

(54) ADAPTING ENCODED DATA TO OVERCOME LOSS OF DATA

(75) Inventors: John Apostolopoulos, Palo Alto, CA (US); Mai-Hsuan Lu, Pittsburgh, PA (US); Wai-tian Tan, Palo Alto, CA (US); Bo Shen, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1179 days.

(21) Appl. No.: 11/413,929

(22) Filed: Apr. 28, 2006

(51) Int. Cl.
 *H03M 13/00* (2006.01)

(52) U.S. Cl. .................... 714/776; 382/232; 375/240.03

(58) Field of Classification Search ................ 714/776; 375/E7.198, E19.049
See application file for complete search history.

(56) References Cited

U.S. PATENT DOCUMENTS

| | | | | |
|---|---|---|---|---|
| 5,541,852 A * | 7/1996 | Eyuboglu et al. | ............ | 709/232 |
| 6,339,450 B1 * | 1/2002 | Chang et al. | ................ | 348/470 |
| 6,498,809 B1 * | 12/2002 | Dean et al. | ................... | 375/240 |
| 6,956,972 B2 * | 10/2005 | Wu et al. | ..................... | 382/238 |
| 2005/0031219 A1 * | 2/2005 | Puri et al. | ................... | 382/250 |

* cited by examiner

*Primary Examiner*—Sam Rizk

(57) ABSTRACT

Methods and systems for overcoming the apparent loss of a data packet are described. Encoded second data can be accessed, where the second data is predictively encoded with reference to encoded first data. A data packet that includes at least a portion of the first encoded data can be sent to a downstream device. If the data packet was not properly received by the downstream device, the encoded second data can be adapted to make it decodable independent of the encoded first data.

18 Claims, 4 Drawing Sheets

ADAPTING ENCODED DATA TO OVERCOME LOSS OF DATA

TECHNICAL FIELD

Embodiments of the present invention relate to data encoding (data compression).

BACKGROUND ART

Wired and wireless networks present many challenges for the system designer. For instance, clients can have different display, power, communication, and computational capabilities. In addition, wireless communication links can have different maximum bandwidths, quality levels, and time-varying characteristics.

One means for achieving scalability and efficiency in data streaming environments is to adapt (transcode) a compressed (encoded) stream at intermediate network nodes. A transcoder takes a compressed stream as input, and then processes it to produce another compressed stream as output. Examples of transcoding processes include bitrate reduction, rate shaping, spatial downsampling, frame rate reduction, frame size reduction, and changing compression formats.

Data packets transmitted over networks can experience delays along the way, perhaps arriving late at a destination node. In some instances, data packets may be lost.

The effects of late or lost data packets may be exacerbated for video data that are predictively encoded (compressed). With predictive encoding, the decoding of a frame of data may rely on the information in another frame. For example, with MPEG (Moving Pictures Experts Group) encoding, a P-frame is predicted from a preceding P-frame or I-frame, and a B-frame is predicted from two preceding P-frames or a preceding I-frame and P-frame. Although predictive encoding introduces dependencies in the encoded data that improve the amount of compression, predictive encoding can also result in error propagation in the event of data loss or late arrival. If, for example, a data packet containing data for an I-frame or P-frame arrives late or is lost, then it might not be possible to properly reconstruct a subsequent P-frame or B-frame. In the case in which a P-frame cannot be properly reconstructed because a preceding I-frame or P-frame is absent, other frames dependent on that P-frame for decoding may not be properly reconstructed. Furthermore, the effect of a decoding error may grow from one frame to the next—that is, when the reconstructed image is displayed, the area of the display affected by the error may increase over time.

Thus, an error introduced due to the absence of even a single data packet can be propagated through a number of frames and may affect the overall quality of the display. Accordingly, a method and/or system that can reduce, or even eliminate, the amount of error propagation that can occur due to loss of a data packet would be valuable.

DISCLOSURE OF THE INVENTION

Embodiments of the present invention pertain to methods and systems for overcoming the apparent loss of a data packet. In one embodiment, encoded second data is accessed, where the second data is predictively encoded with reference to encoded first data. A data packet that includes at least a portion of the first encoded data is sent to a downstream device. If the data packet was not properly received by the downstream device, the encoded second data is adapted to make it decodable independent of the encoded first data.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

The descriptions and examples provided herein are generally applicable to different types of multimedia data (also referred to herein as media data or media content); however, embodiments according to the present invention are not so limited. One example of multimedia data is video data accompanied by audio data; for example, a movie with soundtrack. The video data may be compressed (encoded) using any of a variety of coding standards including, but not limited to, Moving Pictures Experts Group (MPEG) 1/2/4 and H.261/2/3/4, JPEG (Joint Photographic Experts Group) 2000 including Motion JPEG 2000, and 3-D subband coding.

Figure 1:
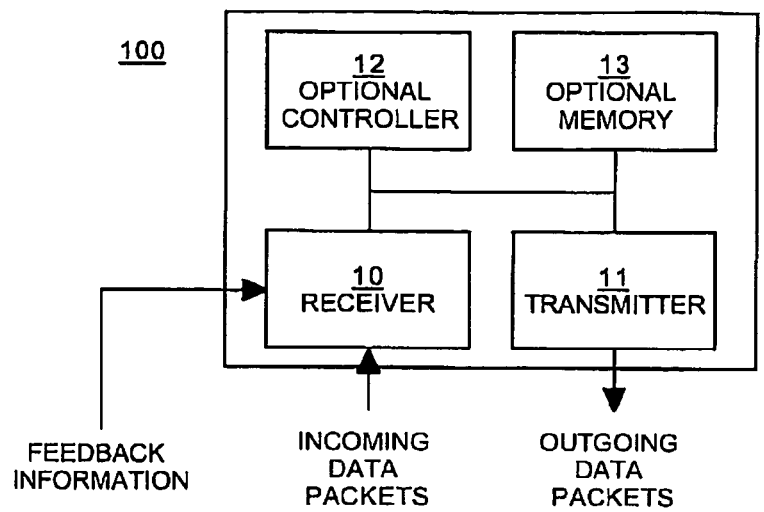
FIG. 1 is a block diagram of one embodiment of a transcoder upon which embodiments of the present invention can be implemented.

FIG. 1 is a block diagram of one embodiment of a transcoder 100 upon which embodiments of the present invention can be implemented. In the embodiment of FIG. 1, transcoder 100 includes a receiver 10 and a transmitter 11 for receiving a stream of data packets and for sending a stream of data packets over a network. Receiver 10 can also be used to receive other types of information, in particular information (feedback) that indicates whether or not the data packets were received at the downstream device (see the discussion of FIGS. 2 and 3, below). Receiver 10 and transmitter 11 are capable of either wired or wireless communication. Transcoder device 100 may include an optional controller 12

(e.g., a processor or microprocessor) and an optional memory 13, or a combination thereof. In one embodiment, memory 13 is used to accumulate received data packets before and/or after they are processed (transcoded).

Generally speaking, transcoder 100 takes a compressed stream as input, and operates on the input to produce another compressed stream as an output. Examples of transcoding operations include, but are not limited to, bitrate reduction, rate shaping, spatial downsampling, frame rate reduction, frame size reduction, and changing compression formats.

As part of its functionality, transcoder 100 may decode (decompress) an encoded input stream, perform a transcoding operation on the decoded data, and then re-encode the transcoded data.

In one embodiment, transcoder 100 has the capability, as well as the necessary input data, to decode encoded data and reconstruct the decoded data, as if for display. That is not to say that the transcoder 100 necessarily decodes and reconstructs encoded data, but simply that is has the capability to do so.

In general, in predictive encoding, the decoding of, for example, a frame of video data may rely on the information in another frame of video data. The basic coding unit of a video sequence is a picture or frame, the basic coding unit of a frame is a macroblock, and the basic coding unit of a macroblock is a block. In predictive encoding, a coding unit (frame, macroblock or block) may be encoded in intra-code mode or in inter-code mode. In intra-code mode, a coding unit is encoded using only the information present in the coding unit itself; thus, decoding an intra-coded coding unit does not rely on another coding unit. In inter-code mode, a coding unit is encoded with reference to another coding unit; thus, decoding an inter-coded coding unit relies on the information in the referenced coding unit.

Significantly, if the input data is predictively encoded, transcoder 100 has the capability to change the dependencies between inter-coded coding units during transcoding. For example, if a frame F+1 is inter-coded with reference to frame F (that is, if frame F+1 depends on frame F for decoding), but some or all of the data for frame F is not received at the decoder, then transcoder 100 can change the inter-frame dependency so that frame F+1 instead depends on another frame (e.g., frame F−1) for decoding. In particular, transcoder 100 can choose as the reference frame a frame that is known to have been properly received at a decoder. If only a portion or portions of frame F are lost, transcoder 100 can change the dependency of frame F+1 so that parts of frame F+1 depend on frame F−1 while other parts of frame F+1 depend on the properly received portions of frame F.

In general, transcoder 100 chooses a previously encoded frame to use as the reference frame for a subsequent frame. However, if the frame previously identified as the reference frame appears to be lost, or if a data packet associated with that frame appears to be lost, then in one embodiment, transcoder 100 chooses a different frame to serve as the reference frame. This approach, as well as some other approaches that can be employed by transcoder 100, are described FIGS. 4, 5 and 6, below.

Figure 2:
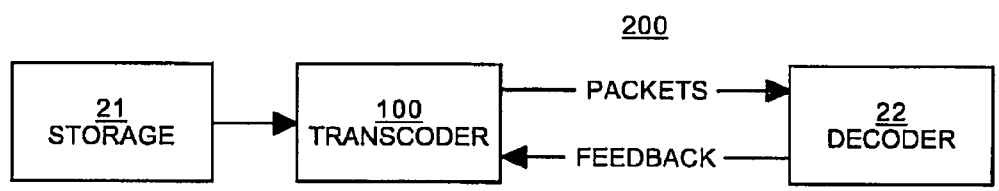
FIG. 2 is a block diagram showing elements of a network in one embodiment in accordance with the present invention.

FIG. 2 is a block diagram showing elements of a network 200 in one embodiment in accordance with the present invention. In the example of FIG. 2, network 200 includes a transcoder 100, a storage element 21 and a decoder 22. There may be other devices in network 200, and there may be devices on the network path between transcoder 100 and decoder 22.

In general, data stored in storage element 21 is accessed by transcoder 100, transcoded by transcoder 100, and sent to decoder 22. In one embodiment, decoder 22 resides on an endpoint device (e.g., a client device that is the ultimate destination of the data).

In the example of FIG. 2, transcoder 100 receives feedback information from decoder 22. In one embodiment, the feedback information is sent over a feedback channel. The feedback information includes information that indicates whether or not a particular data packet, sent from transcoder 100 to decoder 22, did indeed reach decoder 22. The effectiveness of the feedback information is a function of the round trip delay (RTD) between the transcoder 100 and the decoder 22—in general, effectiveness increases as RTD decreases.

The feedback information may include an acknowledgment (ACK) signal that is associated with the data packet, indicating that the data packet was properly received at decoder 22. Alternatively, the feedback information may include a negative acknowledgment (NACK) signal that is associated with the data packet, indicating that the data packet was not properly received at decoder 22.

As an alternative to receiving feedback information from decoder 22, feedback information may be received from a device on the network path between transcoder 100 and decoder 22. That is, any device or entity (e.g., a gateway, etc.) on the network path between transcoder 100 and decoder 22 that identifies the loss of a data packet can notify transcoder 100 of the lost packet.

In addition, feedback from the various layers of the network 200 can be useful in lieu of a feedback channel. For example, a wireless network may utilize an error resilience strategy similar to IEEE 802.11 CSMA/CA (Carrier Sense Multiple Access/Collision Avoidance). Specifically, the media access control (MAC) layer can use an explicit automatic repeat request (ARQ) scheme for error control. Whenever a data packet is received within a certain amount of time in ACK mode, the MAC layer knows that the data packet was successfully transmitted; otherwise, the data packet is retransmitted until the retry limit is reached. In other words, the MAC layer knows which data packet is lost because of the nature of the protocol. In a crosslayer-designed system, the application layer can utilize this information in an error resilience strategy. An advantage of such an approach is that packet loss information is prompt—compared to the use of an application layer feedback channel, packet loss information can be gained more quickly after a packet is sent (or discarded). Another advantage is that not all client devices support a feedback channel.

Transcoder 100 responds to the apparent loss of a data packet by ensuring that other, subsequent data packets do not directly or indirectly depend on the data contained in the lost data packet for decoding. Some strategies that can be used by transcoder 100 to achieve this are discussed below in conjunction with FIGS. 4, 5 and 6, below.

Continuing with reference to FIG. 2, the loss of the data packet is described as apparent because the data packet may not be lost, but instead may be late in arriving at decoder 22. For example, video frames are displayed in a certain sequence, and may need to be decoded by a certain deadline if they are to be ready in time to take their proper place in the sequence. Consequently, if the data in the data packet is relied on for decoding an inter-coded coding unit, but arrives too late to be used, then for the purpose of decoding that interceded-coding unit, that data packet is essentially lost (however, sometimes the late data packet may still be useful for decoding other, subsequent data packets). Alternatively, the data packet may arrive on time but contain corrupted data. A data packet may also be intentionally discarded for any of a variety of reasons. In general, a lost, late, discarded or corrupted data packet is described herein as a data packet that is not properly received. At times, for simplicity of discussion, a lost, late, discarded or corrupted data packet is simply referred to herein as a lost data packet.

Figure 3:
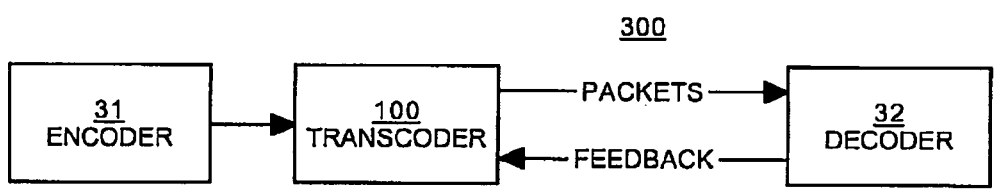
FIG. 3 is a block diagram showing elements of a network in another embodiment in accordance with the present invention.

FIG. 3 is a block diagram showing elements of a network 300 in another embodiment in accordance with the present invention. In the example of FIG. 3, network 300 includes a transcoder 100, an encoder 31 and a decoder 32. There may be other devices in network 300, and there may be devices on the network paths between encoder 31 and transcoder 100, and between transcoder 100 and decoder 32.

In much the same way as described above in conjunction with FIG. 2, transcoder 100 receives feedback information from decoder 32, from another device on the path between transcoder 100 and decoder 32, and/or from the various layers of network 300. A difference between the examples of FIGS. 2 and 3 is that, in FIG. 2, the content to be streamed is pre-encoded and stored (e.g., video on demand), while the content to be streamed in FIG. 3 is encoded and transmitted in real time. Embodiments in accordance with the present invention are applicable in either case—for real-time encoded data, and/or for stored, pre-encoded data.

To summarize, in response to receiving information about which data packets have been properly received (and conversely, which data packets have not been properly received), transcoder 100 can adapt the transcoding of predictively encoded data to eliminate or significantly reduce the amount of error propagation that may occur when that data is decoded.

An effective technique for recovering from lost data packets is referred to as "NewPred" in MPEG-4 and as Reference Picture Standard (RPS) in H.263 and H.264 (for simplicity of discussion, it may be referred to herein only as NewPred). NewPred allows a video source to recover from data loss by providing flexibility in choosing the reference frame for predicting other frames during decoding. As mentioned above, in a sequence of compressed video data, some of the video coding units (e.g., frames) are predicted using data from a specified reference frame. Using NewPred, it is possible to change the identity of the reference frame so that frames will not reference a lost frame, effectively stopping error propagation. With reference to FIGS. 2 and 3, if decoders 22 and 32 are NewPred-capable, then transcoder 100 can instruct the decoders to use one coding unit instead of another as the reference coding unit.

Furthermore, transcoder 100 is in general closer to the decoder 32 than the real-time encoder 31. According to embodiments of the present invention, as will be seen, NewPred can be implemented using transcoder 100 instead of using real-time encoder 31. This is useful for a number of reasons. For example, it relieves encoder 31 of this burden. Also, encoder 31 may be a legacy device that is not NewPred-capable. In addition, the RTD between the decoder 32 and the encoder 31 may be too long, such that implementation of NewPred at the encoder 31 may be less effective.

Thus, one factor that may affect an error recovery strategy implemented by transcoder 100 is whether the downstream decoders 22 and 32 are NewPred-capable or not. Indeed, there may be legacy devices in use that are not NewPred-capable. However, whether or not a device is NewPred-capable may not be known to the transcoder 100.

Another factor that may affect an error recovery strategy implemented by transcoder 100 is the type of error recovery technique employed by the decoders 22 and 32. This is of particular interest when an encoded video frame, for example, is sent in multiple data packets, where some of the packets are properly received and some are not. However, the type of error recovery technique employed by the decoders may not be known to transcoder 100.

Figure 4:
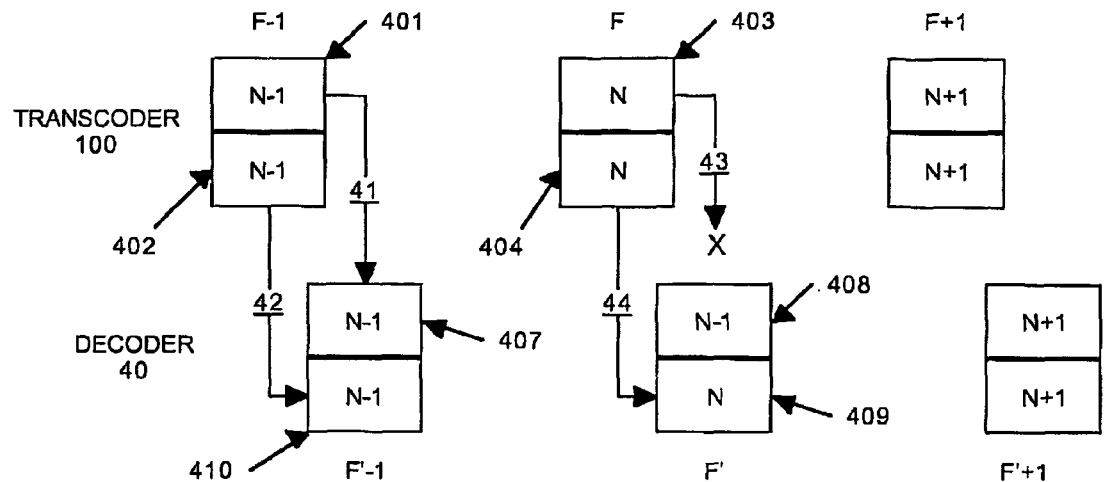
FIGS. 4, 5 and 6 illustrate different embodiments of error recovery techniques that may be employed by a decoder in accordance with the present invention.

FIG. 4 illustrates a first type of error recovery technique that may be used by a decoder in one embodiment in accordance with the present invention. In the example of FIG. 4, frame F is predictively encoded with reference to frame F−1, and frame F+1 is predictively encoded with reference to frame F. The content associated with frame F−1 is represented as N−1, the content associated with frame F is identified as N, and the content associated with frame F+1 is identified as N+1. Transcoder 100 encodes the upper portion 401 and lower portion 402 of frame F−1 as data packets 41 and 42, respectively. In the example of FIG. 4, both data packets are received by decoder 40 and used to construct reconstructed frame F'−1.

Transcoder 100 encodes the upper portion 403 and the lower portion 404 of frame F as data packets 43 and 44, respectively. However, in the example of FIG. 4, packet 43 is not properly received by decoder 40 although packet 44 is received. In such a case, decoder 40 employs a previous frame error concealment strategy. According to this strategy, packet 44 is decoded to construct the lower portion 409 of reconstructed frame F', and the pixels are copied from the upper portion 407 of reconstructed frame F'−1 to construct the upper portion 408 of reconstructed frame F'.

Figure 5:
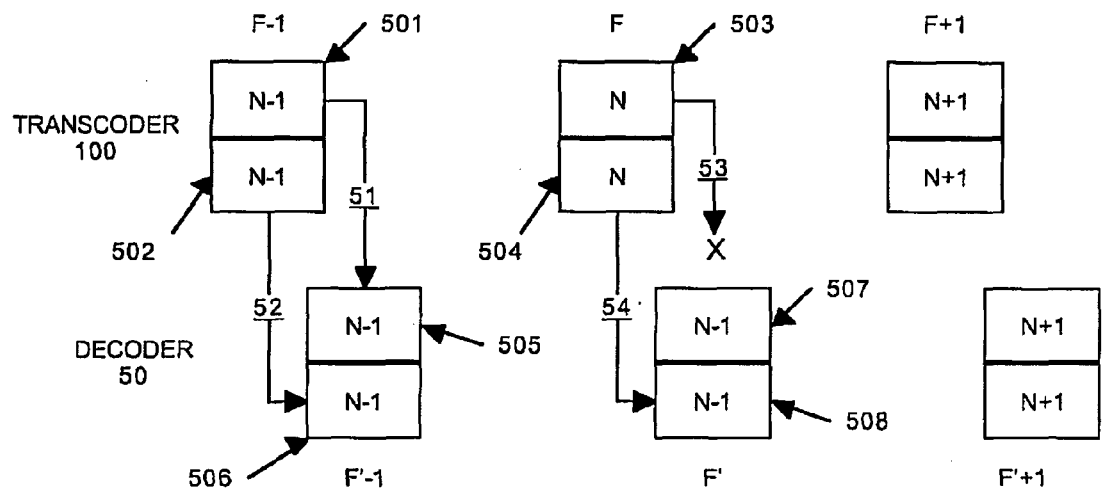

FIG. 5 illustrates a second type of error recovery technique that may be used by a decoder in one embodiment in accordance with the present invention. In the example of FIG. 5, frame F is predictively encoded with reference to frame F−1, and frame F+1 is predictively encoded with reference to frame F. Transcoder 100 encodes the upper portion 501 and lower portion 502 of frame F−1 as data packets 51 and 52, respectively. In the example of FIG. 5, both data packets are received by decoder 50 and used to construct reconstructed frame F'−1.

Transcoder 100 encodes the upper portion 503 and the lower portion 504 of frame F as data packets 53 and 54, respectively. However, in the example of FIG. 5, packet 53 is not properly received by decoder 50 although packet 54 is received. In such a case, decoder 50 employs a freeze frame error concealment strategy. According to this strategy, packet 54 is not used, and the pixels from the upper and lower portions 505 and 506 of reconstructed frame F'−1 are duplicated to construct the upper and lower portions 507 and 508 of reconstructed frame F'.

With reference to both FIGS. 4 and 5, in the event that frame F−1 is encoded in a single data packet and frame F is also encoded in a single data packet, and if the data packet corresponding to frame F−1 is received at the decoders but the data packet corresponding to frame F is lost, then the results of the first and second error recovery techniques are the same. That is, using either technique, the reconstructed frame F'−1 is constructed using the properly received data packet, and the reconstructed frame F' is constructed by duplicating reconstructed frame F'−1. Thus, in the examples of FIGS. 4 and 5, the type of error recovery technique employed by the decoders is a factor only when the frames F−1 and F are encoded in multiple data packets.

Figure 6:
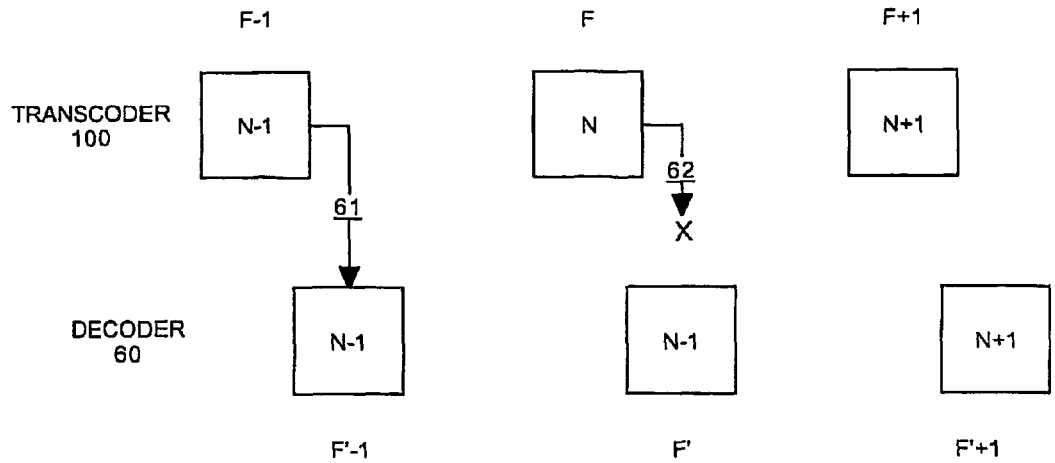

FIG. 6 shows frame F−1 encoded as a single data packet 61 that is received by decoder 60 and used to construct reconstructed frame F'−1. Frame F is also encoded as a single data packet 62; however, packet 62 is not properly received by decoder 60. Consequently, the reconstructed frame F' is constructed by duplicating the pixels from reconstructed frame F'−1. Thus, in the example of FIG. 6, reconstructed frame F' is the same regardless of whether previous frame error concealment or freeze frame error concealment is used by decoder 60.

As mentioned above, a transcoder may not know whether or not a decoder is NewPred-capable, and may not know the type of error recovery technique employed by the decoder. Embodiments in accordance with the present invention address this by considering the following scenarios and developing a transcoding strategy for each:

Scenario 1. The transcoder encodes a frame in multiple data packets and the decoder is NewPred-capable. This scenario is described in conjunction with FIGS. 4 and 5, below.

Scenario 2. The transcoder encodes a frame in multiple data packets and the decoder is not NewPred-capable. This scenario is also described in conjunction with FIGS. 4 and 5, below.

Scenario 3. The transcoder encodes a frame in a single data packet. Whether or not the decoder is NewPred-capable is not a factor in this scenario, as will be seen. This scenario is described in conjunction with FIG. 6, below.

Scenario 1: In this scenario, the transcoder encodes a frame in multiple data packets and the decoder is NewPred-capable. Recall that, in the example of FIG. 4, the upper portion 408 of reconstructed frame F' is erroneous in the sense that it was constructed by duplicating the upper portion 407 of reconstructed frame F'−1. Because decoder 40 is NewPred-capable, transcoder 100 can specify that the decoding of future frames (e.g., frame F+1) will not depend on reconstructed frame F' but instead will utilize reconstructed frame F'−1 (that is, during encoding, frame F−1 is the reference for frame F+1, while during decoding, reconstructed frame F'−1 is the reference for constructing reconstructed frame F'+1). Also, transcoder 100 can intelligently transcode a portion of frame F+1 so that, for decoding, the corresponding portion of reconstructed frame F'+1 is constructed using the non-erroneous portion (e.g., the lower portion 409) of reconstructed frame F'.

Continuing with scenario 1, but with reference to FIG. 5, recall that both the upper and lower portions 507 and 508 of reconstructed frame F' are erroneous in the sense that they were constructed by duplicating the corresponding portions of reconstructed frame F'−1. Because decoder 50 is NewPred-capable, transcoder 100 can specify that the decoding of future frames (e.g., frame F+1) will utilize reconstructed frame F'−1.

Scenario 2: In this scenario, the transcoder encodes a frame in multiple data packets and the decoder is not NewPred-capable. Again, recall that, in the example of FIG. 4, the upper portion 408 of reconstructed frame F' is erroneous in the sense that it was constructed by duplicating the upper portion 407 of reconstructed frame F'−1. Also recall that both the upper and lower portions 507 and 508 of reconstructed frame F' are erroneous in the sense that they were constructed by duplicating the corresponding portions of reconstructed frame F'−1.

In one scenario 2 embodiment, transcoder 100 transcodes the erroneous portions 407, 507 and 508 as intra-coded macroblocks.

In another scenario 2 embodiment, with reference to FIG. 4, in response to learning that data packet 43 was not properly received, transcoder 100 can instruct decoder 40, or some other network device on the path between transcoder 100 and decoder 40, to drop data packet 44 as well. As a result, decoder 40 will duplicate the pixels in the lower portion 410 of reconstructed frame F'−1 to construct the lower portion 409 of reconstructed frame F', in the same manner as the pixels in the upper portion 407 of reconstructed frame F'−1 are duplicated to construct the upper portion 408 of reconstructed frame F'. By causing data packet 44 to be dropped, the error recovery technique utilized by decoder 40 behaves the same, at least superficially, as the error recovery technique utilized by decoder 50 of FIG. 5, in that both decoders 40 and 50 produce a reconstructed frame F' that is constructed by duplicating the reconstructed frame F'−1.

In yet another scenario 2 embodiment, with reference to FIGS. 4 and 5, in response to learning that data packet 43 or 53 was not properly received, transcoder 100 will instruct decoder 40, or some other network device on the path between transcoder 100 and decoder 40, to drop data packet 44, and also encodes the entire frame F in a single, large data packet (sometimes referred to as a jumbo packet) that is larger than the maximum transport unit (MTU) of the network (e.g., for Ethernet, the MTU is 1520 bytes). This approach generally forces the network to perform packet fragmentation. However, networks generally treat jumbo packets in an all or nothing manner—in other words, if any fragment of the jumbo packet is lost, then the entire jumbo packet is treated as being lost. Therefore, in this embodiment, either the entire encoded frame is delivered to the decoder 40 or 50, or none of it is. In the latter situation, the reconstructed frame F' is constructed by duplicating reconstructed frame F'−1. Thus, as in the embodiment above, the error recovery techniques utilized by decoders 40 and 50 behave the same, at least superficially, in that both decoders 40 and 50 produce a reconstructed frame F' that is constructed by duplicating the reconstructed frame F'−1.

In still another scenario 2 embodiment, with reference to FIGS. 4 and 5, the transcoder 100 can place the entire frame F in a single, large data packet (sometimes referred to as a jumbo packet) that is larger than the MTU of the network. Note that in contrast with the prior embodiment, in this embodiment the entire frame is placed in a single jumbo packet irrespective of whether packet loss has occurred. Therefore, in this embodiment, because the network generally treats jumbo packets in an all or nothing manner (either the entire jumbo packet is delivered or none of it is delivered), either the entire encoded frame is delivered to the decoder 40 or 50, or none of it is. In the latter situation, the reconstructed frame F' is constructed by duplicating reconstructed frame F'−1. Thus, as in the embodiments above, the error recovery techniques utilized by decoders 40 and 50 behave the same, at least superficially, in that both decoders 40 and 50 produce a reconstructed frame F' that is constructed by duplicating the reconstructed frame F'−1.

Scenario 3: The transcoder encodes a frame in a single data packet (where the data packet may be smaller or larger than the network's MTU), and the decoder may or may not be NewPred-capable. With reference to FIG. 6, recall that the reconstructed frame F' is constructed by duplicating the reconstructed frame F'−1. In contrast to the examples of FIGS. 4 and 5, scenario 3 will not result in the possibility of a reconstructed frame that is partially correct and partially erroneous. As such, in response to learning that data packet 62 was not properly received, transcoder 100 can transcode frame F+1 with reference to frame F−1 (that is, reconstructed frame F'+1 will depend on reconstructed frame F'−1). This transcoding operation is the same regardless of whether or not the decoder is NewPred-capable. Optionally, the transcoder can ensure that each encoded frame is smaller than the network's MTU.

The transcoder 100 can perform the operations described in conjunction with FIGS. 4, 5 and 6 (scenarios 1, 2 and 3) above in conjunction with other types of transcoding and encoding operations, such as those previously mentioned herein. Transcoder 100 can perform the operations described in conjunction with FIGS. 4, 5 and 6 (scenarios 1, 2 and 3) on encoded data (compressed domain processing), or the encoded data can be decoded, operated on, and then re-encoded.

If transcoding is invoked in response to loss of a data packet, it is desirable that a single packet loss does not trigger the transcoding of an indefinite number of frames. In one embodiment, transcoder 100 detects the presence of I-frames (and also S-frames in H.264), and stops transcoding upon receiving those types of frames.

The discussion above presumes that transcoder 100 may not know the error recovery technique employed by the decoder (e.g., previous frame error concealment as described in conjunction with FIG. 4, or freeze frame error concealment as described in conjunction with FIG. 5). As an alternative to the above, the error recovery technique employed by the decoder can be learned through the use of appropriate protocols.

Also, the discussion above was based on the use of video frames as the coding unit. This discussion can be extended to the use of other types of coding units such as macroblocks and blocks.

Figure 7:
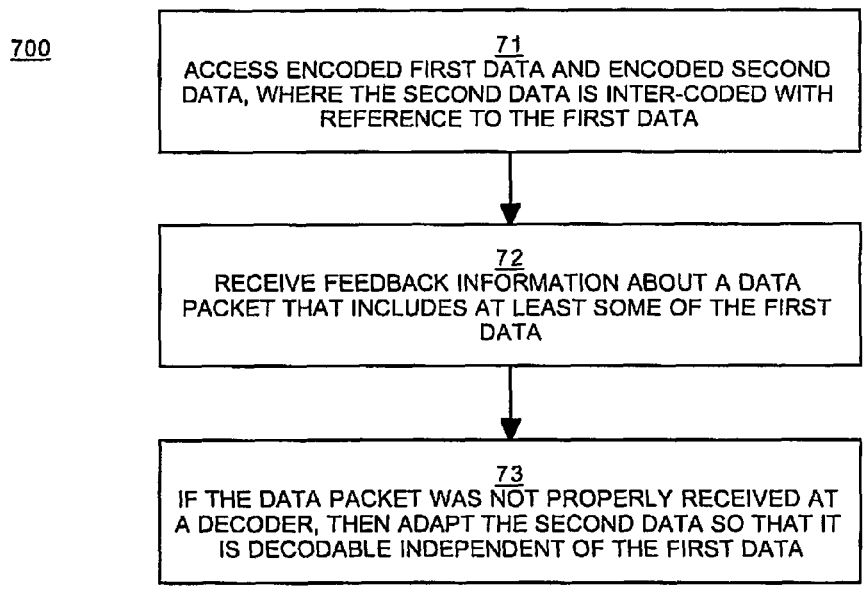
FIG. 7 is a flowchart of a method for transcoding data in accordance with an embodiment of the present invention.
Figure 8:
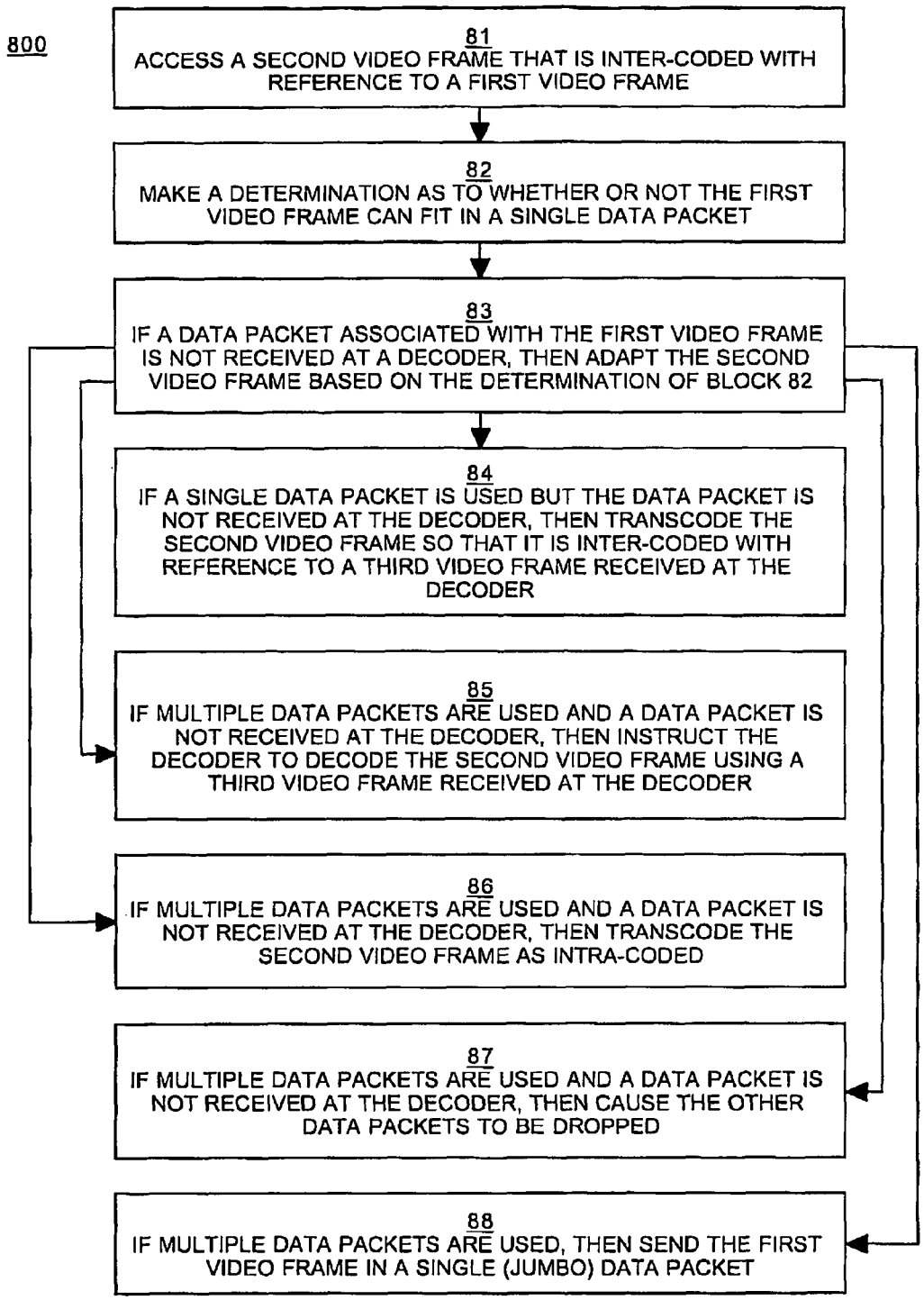
FIG. 8 is a flowchart of a method for transcoding data in accordance with another embodiment of the present invention.

FIG. 7 is a flowchart 700 of a method for transcoding data in accordance with an embodiment of the present invention. FIG. 8 is a flowchart 800 of a method for transcoding data in accordance with another embodiment of the present invention. Although specific steps are disclosed in flowcharts 700 and 800, such steps are exemplary. That is, embodiments of the present invention are well-suited to performing various other steps or variations of the steps recited in flowcharts 700 and 800. It is appreciated that the steps in flowcharts 700 and 800 may be performed in an order different than presented, and that not all of the steps in flowcharts 700 and 800 may be performed. All of, or a portion of, the methods described by flowcharts 700 and 800 may be implemented using computer-readable and computer-executable instructions which reside, for example, in computer-usable media of a computer system. In one embodiment, flowcharts 700 and 800 are performed by transcoder 100 of FIGS. 1-6.

With reference to FIG. 7, in block 71, encoded first data and encoded second data are accessed. The second data is predictively encoded (inter-coded) with reference to the encoded first data. For example, the encoded first data may correspond to frame F of FIGS. 4-6, and the encoded second data may correspond to frame F+1 of FIGS. 4-6.

In block 72 of FIG. 7, information (feedback) is received that indicates whether a data packet (e.g., data packet 43, 53 or 62 of FIGS. 4-6) was properly received by a downstream device (e.g., a decoder device such as decoders 22, 32, 40, 50 and 60 of FIGS. 2-6). The data packet may contain a portion of the encoded first data, or it may contain all of the encoded first data. In the former instance, multiple data packets may be used to carry the encoded first data, and in the latter instance, the encoded first data may fit into a single data packet.

In block 73 of FIG. 7, if the data packet was not properly received at the downstream (decoder) device, the encoded second data is adapted (transcoded) to produce encoded data that is decodable independent of the encoded first data. In one embodiment, the adaptation of the encoded second data depends on whether or not the encoded first data was contained within a single data packet. In another embodiment, the adaptation of the encoded second data depends on whether or not the downstream (decoder) device is NewPred-capable.

In one embodiment, in which the encoded first data fit into a single data packet (and regardless of whether or not the decoder device is NewPred-capable), the encoded second data is transcoded in inter-code mode with reference to other encoded data (e.g., frame F−1 of FIGS. 4-6) that was received by the downstream (decoder) device.

In one embodiment, in which the downstream (decoder) device is NewPred-capable (and regardless of whether or not the encoded first data fit into a single data packet), the downstream device is instructed to decode the encoded second data using data (e.g., frame F−1 of FIGS. 4-6) that was received by the downstream device.

In one embodiment in which the downstream (decoder) device is not NewPred-capable and in which the encoded first data was sent using multiple data packets, the encoded second data is transcoded in intra-code mode. In another embodiment in which the downstream (decoder) device is not NewPred-capable and in which the encoded first data was sent using multiple data packets, a second data packet that includes data for a second portion of the video frame is caused to be dropped. In yet another embodiment in which the downstream (decoder) device is not NewPred-capable and in which the encoded first data was sent using multiple data packets, the entirety of data for the video frame is transmitted in a single data packet (e.g., a jumbo packet).

With reference now to FIG. 8, in block 81, an encoded second video frame (e.g., frame F+1 of FIGS. 4-6) that is inter-coded with reference to an encoded first video frame (e.g., frame F of FIGS. 4-6) is accessed.

In block 82 of FIG. 8, a determination is made as to whether or not the first video frame is transportable to a downstream device (e.g., decoder device 22, 32, 40, 50 and 60 of FIGS. 2-6) in a single data packet.

In block 83 of FIG. 8, regardless of whether a single data packet or multiple data packets is used to transport the first video frame, if a data packet associated with the encoded first video frame was not properly received at the downstream device, the second video frame is transcoded depending on the result of the determination made in block 82.

In block 84, if the first video frame is transportable in a single data packet and if the single data packet is not properly received by the downstream (decoder) device, then the second video frame is transcoded so that it is inter-coded with reference to an encoded third video frame (e.g., frame F−1 of FIGS. 4-6) that was received by the downstream device.

In block 85 of FIG. 8, in one embodiment, if the first video frame is transported using multiple data packets and if any one of the data packets is not properly received by the downstream (decoder) device, then the downstream device is instructed to decode the second video frame using an encoded third video frame (e.g., frame F−1 of FIGS. 4-6) that was received by the downstream device.

In block 86 of FIG. 8, in another embodiment, if the first video frame is transported using multiple data packets and if any one of the data packets is not properly received by the downstream (decoder) device, then the second video frame is transcoded as an intra-coded frame.

In block 87, in yet another embodiment, if the first video frame is transported using multiple data packets and if any one of the data packets is not properly received by the downstream device, then the remainder of the multiple data packets are caused to be dropped.

In block 88, in one more embodiment, if the first video frame is transported using multiple data packets and if any one of the data packets is not properly received by the downstream (decoder) device, then the first video frame is resent in a single data packet. Alternatively, in another embodiment, if a video frame would be transported using multiple data packets, then the video frame is instead sent as a single large (e.g., jumbo) data packet (regardless of whether a data packet is lost).

In summary, embodiments in accordance with the present invention pertain to a transcoder, and methods implemented by transcoders, that control or eliminate error propagation in predictively encoded data (e.g., video data). More specifically, when a transcoder receives feedback that indicates a particular data packet was not properly received at a downstream decoder device, the transcoder adapts the transcoding to reduce the amount of error propagation that may occur as a result of the lost packet.

Embodiments in accordance with the present invention are useful for data that is pre-encoded and stored (e.g., video on demand), as well as for data that is being encoded in real time. Furthermore, embodiments in accordance with the present invention are compatible with legacy devices that are not NewPred-capable or that do not use error recovery techniques of a similar nature.

Embodiments of the present invention are thus described. While the present invention has been described in particular embodiments, it should be appreciated that the present invention should not be construed as limited by such embodiments, but rather construed according to the following claims.

What is claimed is:

1. A method of overcoming apparent loss of a data packet in a communication device, said method comprising:
   accessing encoded second data at a transcoder, wherein said second data is predictively encoded with reference to encoded first data;
   receiving information at said transcoder that indicates whether a first data packet comprising at least a portion of said encoded first data was properly received by a downstream device; and
   if said first data packet was not properly received at said downstream device, adapting said encoded second data at said transcoder to produce encoded second data that is decodable independent of said encoded first data, said second data different from said first data.

2. The method of claim 1 wherein said encoded first data comprises a video frame, wherein said adapting is according to whether said encoded first data fits into a single data packet and wherein said adapting is also according to a type of error recovery technique used by said downstream device to compensate for not properly receiving said first data packet.

3. The method of claim 1 wherein said adapting comprises transcoding said encoded second data in inter-code mode with reference to data that was received by said downstream device.

4. The method of claim 1 further comprising instructing said downstream device to decode said encoded second data that is decodable independent of said encoded first data using data that was received by said downstream device.

5. The method of claim 1 wherein said adapting comprises transcoding said second data in intra-code mode.

6. The method of claim 1 wherein said first data packet comprises data for a first portion of a video frame, wherein in response to receiving said information indicating said first data was not properly received by a downstream device, said method further comprises transmitting the entirety of data for said video frame in a single data packet.

7. A transcoder device for processing data, said transcoder device in communication with a network comprising a plurality of devices and communication paths between said devices, said transcoder device comprising:
   a transmitter operable for transmitting encoded data to a destination device over said network;
   a receiver coupled to said transmitter and operable for receiving information that indicates whether a transmitted portion of said encoded data was properly received at said destination device; and
   a transcoder coupled to said receiver and said transmitter, said transcoder operable for accessing said encoded data and for adapting said encoded data according to an attribute of said network;
   wherein said encoded data includes a first portion and a second portion that is decodable dependent on said first portion, and wherein said transcoder responds to information indicating that said first portion was not properly received at said destination device by adapting said second portion so that said second portion is decodable independent of said first portion at said destination device.

8. The transcoder device of claim 7 wherein said adapting comprises transcoding said second portion so that it is dependent on a third portion of said encoded data that was received by said destination device.

9. The transcoder device of claim 7 wherein said destination device is instructed to decode said second portion using a third portion of said encoded data that was received by said destination device.

10. The transcoder device of claim 7 wherein said adapting comprises transcoding said second portion in intra-code mode.

11. The transcoder device of claim 7 wherein said first portion comprises a portion of a video frame, wherein in response to receiving said information indicating said first data was not properly received by a downstream device, the entirety of encoded data for said video frame is transmitted in a single data packet.

12. In a device in communication with a network, a method of overcoming apparent loss of a data packet, said method comprising:
   accessing an encoded second video frame that is inter-coded with reference to an encoded first video frame;
   determining whether said first video frame is transportable to a downstream device in a single data packet; and
   transcoding said second video frame according to a result of said determining.

13. The method of claim 12 wherein, if said first video frame is transportable in said single data packet and if said single data packet is not properly received by said downstream device, then said method comprises transcoding said second video frame so that it is inter-coded with reference to an encoded third video frame that was received by said downstream device.

14. The method of claim 12 wherein, if said first video frame is transported using multiple data packets and if any of said data packets is not properly received by said downstream device, then said method comprises instructing said downstream device to decode said second video frame using an encoded third video frame that was received by said downstream device.

15. The method of claim 12 wherein, if said first video frame is transported using multiple data packets and if any of said multiple data packets is not properly received by said downstream device, then said method comprises transcoding said second video frame as an intra-coded frame.

16. The method of claim 12 wherein, if said first video frame is transported using multiple data packets and if any of said multiple data packets is not properly received by said downstream device, then said method comprises causing the remainder of said multiple data packets to be dropped.

17. The method of claim 12 wherein, if said first video frame is transported using multiple data packets and if any of said multiple data packets is not properly received by said downstream device, then said method comprises resending said first video frame in a single data packet.

18. The method of claim 12 transmitting the entirety of said first video frame in said single data packet, wherein said single data packet larger than the maximum transport unit of said network.

* * * * *